United States Patent
Trpcevski et al.

(10) Patent No.: US 9,551,406 B2
(45) Date of Patent: Jan. 24, 2017

(54) SECURING DEVICE FOR AN ACTUATING LEVER

(71) Applicant: Schaeffler Technologies GmbH & Co. KG, Herzogenaurach (DE)

(72) Inventors: Ljupco Trpcevski, Shelby Township, MI (US); Vanessa Woodiwiss, Windsor (CA); Rainer Schwinn, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/504,730

(22) Filed: Oct. 2, 2014

(65) Prior Publication Data

US 2015/0090070 A1 Apr. 2, 2015

Related U.S. Application Data

(60) Provisional application No. 61/885,727, filed on Oct. 2, 2013.

(51) Int. Cl.
*F01L 1/18* (2006.01)
*F16H 25/08* (2006.01)

(52) U.S. Cl.
CPC ............... *F16H 25/08* (2013.01); *F01L 1/185* (2013.01); *F01L 2001/187* (2013.01); *Y10T 74/2107* (2015.01)

(58) Field of Classification Search
CPC ..... F16H 25/08; F01L 1/185; F01L 2001/187; Y10T 74/2107
See application file for complete search history.

(56) References Cited

U.S. PATENT DOCUMENTS

| | | | | |
|---|---|---|---|---|
| 5,775,280 A | * | 7/1998 | Schmidt | F01L 1/181 123/90.41 |
| 6,047,675 A | * | 4/2000 | Kunz | 123/90.41 |
| 2012/0260874 A1 | | 10/2012 | Moeck et al. | |
| 2014/0041604 A1 | | 2/2014 | Trpcevski et al. | |

* cited by examiner

*Primary Examiner* — Zelalem Eshete
(74) *Attorney, Agent, or Firm* — Antun M. Peakovic

(57) ABSTRACT

A device for securing a support element to an actuating lever of a valvetrain of an internal combustion. The actuating lever having a socket dome to accept a socket end of the support element and a roller pocket, with the securing device seated on the socket dome, extending through the roller pocket and splitting into two arms that extend on opposite ends of a circumferential groove below the socket end of the support element.

9 Claims, 6 Drawing Sheets

SECURING DEVICE FOR AN ACTUATING LEVER

The present disclosure relates to a securing device for an actuating lever in a valve control mechanism for an internal combustion engine.

BACKGROUND

Securing devices for actuating levers in valve control mechanisms for internal combustion engines are known in the art. For instance, U.S. Pat. No. 5,775,280 discloses a generally U-shaped retention clip that can be used for securing an actuating lever to a support member.

Securing devices of this type are utilized, mainly, to provide a unitary subassembly of the actuating lever and support member, for assembly into a valvetrain. By providing such a subassembly, extra components and orientation errors between the components may be avoided in a vehicle assembly environment. In addition, securing the actuating lever and support member together with a securing device aids in ease of shipping.

Features are sometimes added to actuating levers to prevent dislocation of pivot elements from actuating levers, often called anti-pop-off features. Also, additional features can be incorporated into actuating levers, or support members to improve performance. Securing devices must, therefore, accommodate for these additional devices. Particularly where the actuating lever has additional features, such as anti-pop-off features, alternative clip configurations are needed.

SUMMARY OF THE INVENTION

Certain terminology is used in the following description for convenience and descriptive purposes only, and is not intended to be limiting to the scope of the claims. The terminology includes the words specifically noted, derivatives thereof and words of similar import.

According to example aspects illustrated herein, there is provided a securing device for securing an actuating lever and support member of a valvetrain of an internal combustion engine, the securing device mounting from the roller pocket, seating around the actuating lever socket dome at an upper periphery, and having a generally U-shaped configuration extending around a recessed groove in the support member.

BRIEF DESCRIPTION OF THE DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner.

Figure 1:
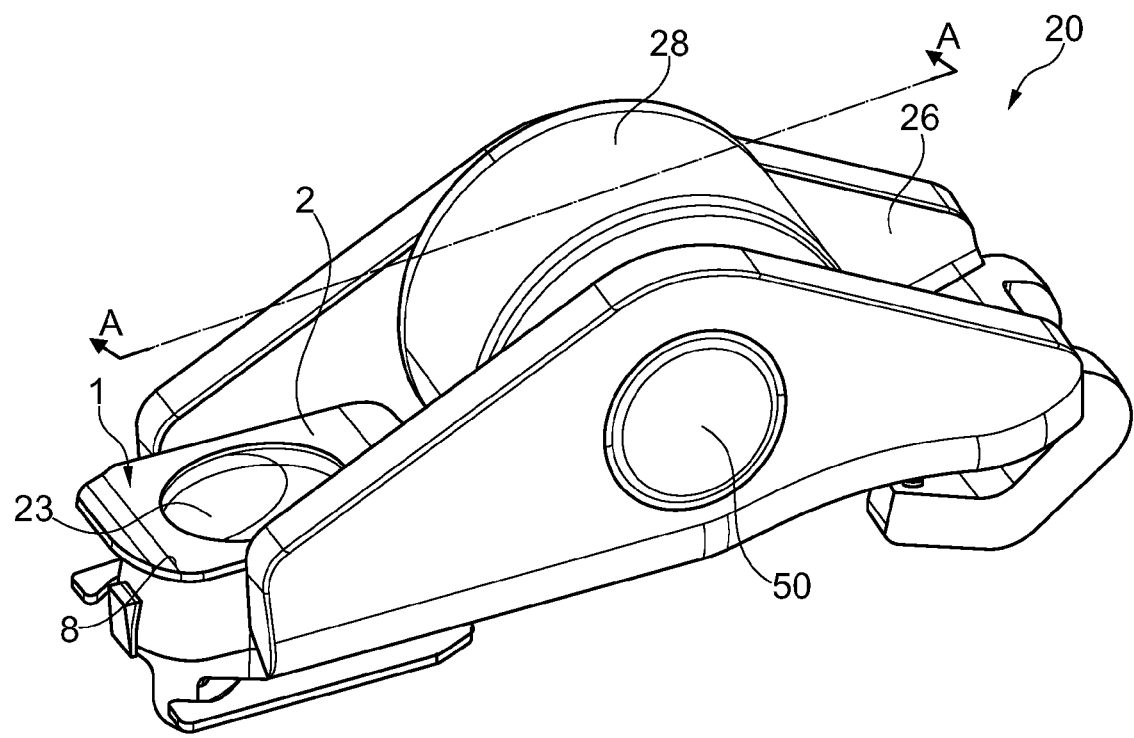
FIG. 1 is a perspective view of an actuating lever and securing device assembly according to one example embodiment.
Figure 2:
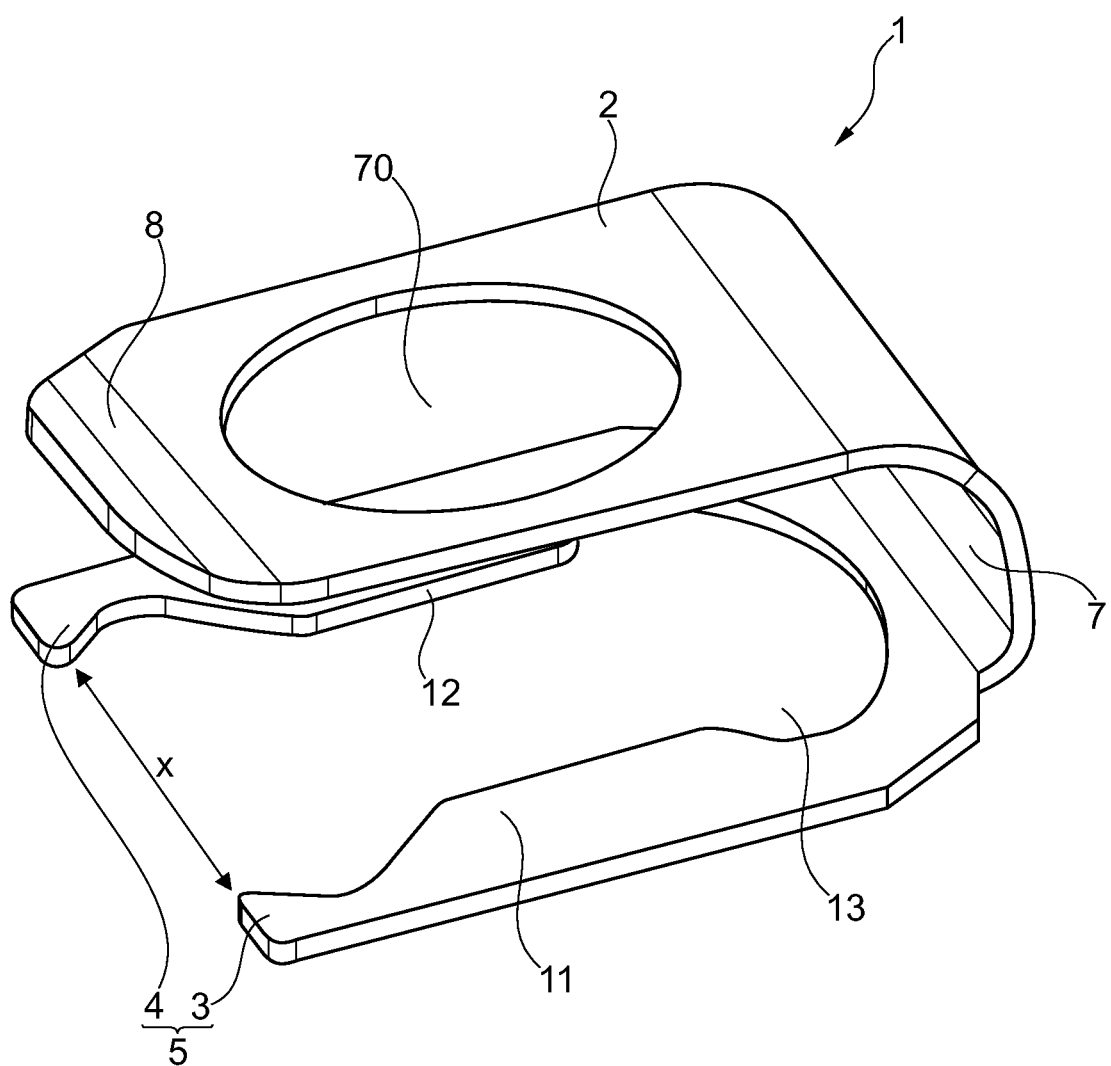
FIG. 2 is a perspective view of the securing device of FIG. 1.
Figure 3:
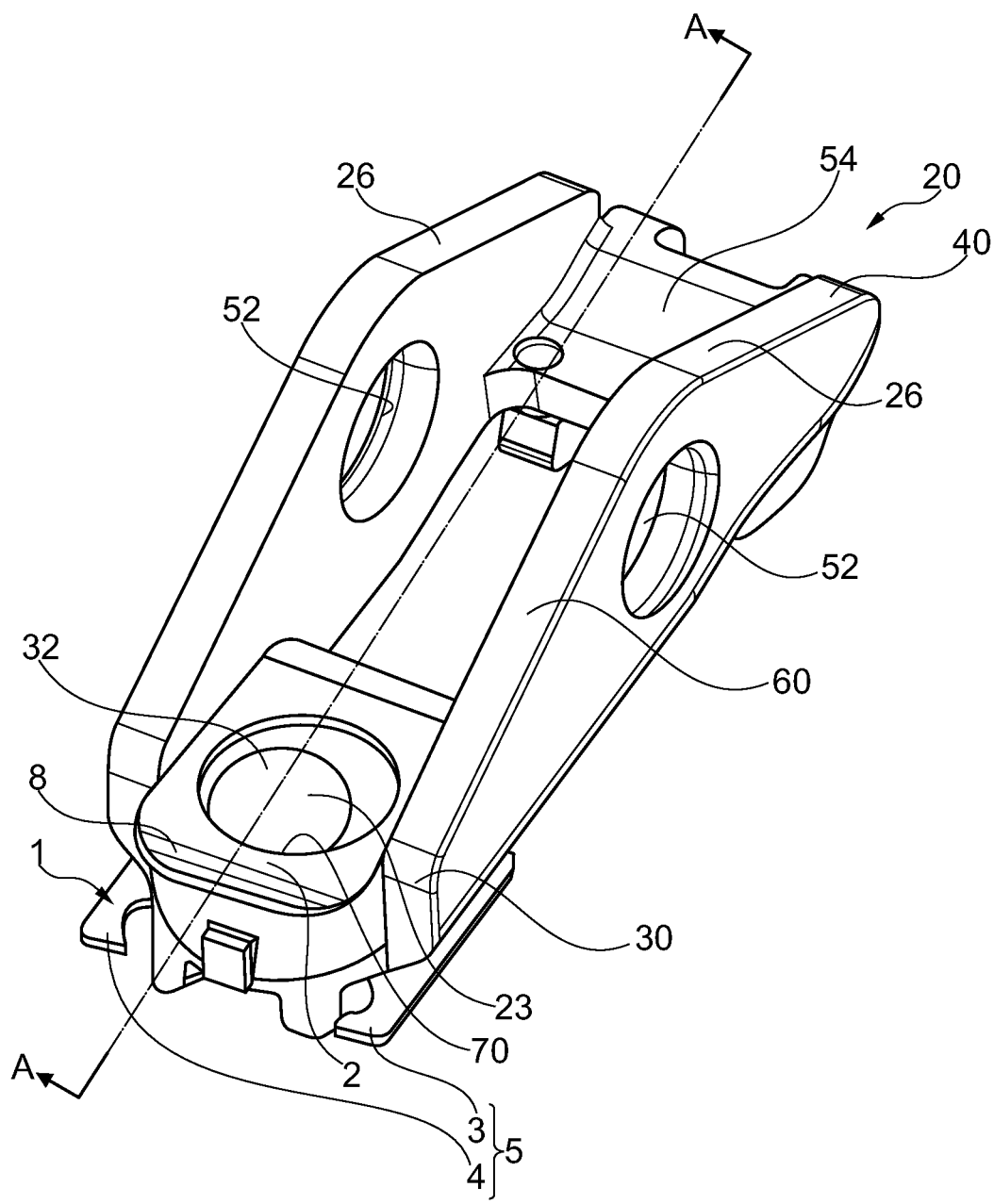
FIG. 3 is a top perspective view of actuating lever and securing device assembly, with roller removed, according to one example embodiment.
Figure 4:
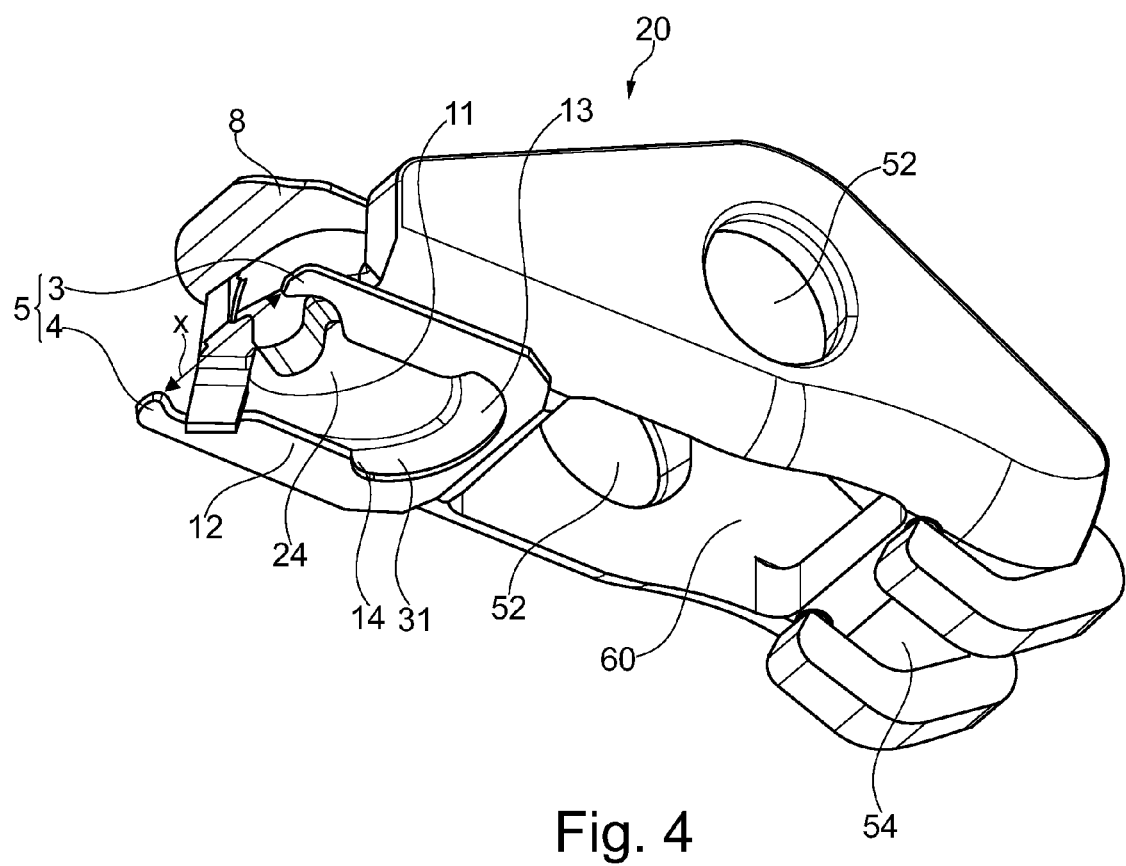
FIG. 4 is a bottom perspective view of actuating lever and securing device assembly of FIG. 1.
Figure 5:
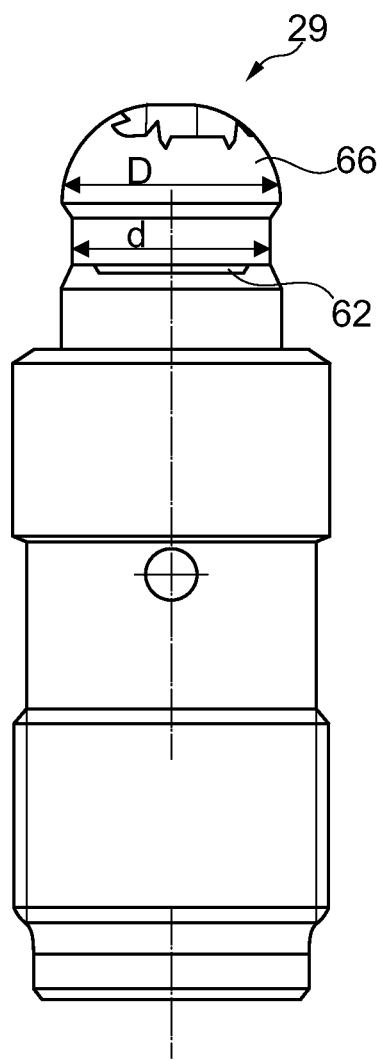
FIG. 5 is a front view of a prior art pivot element.
Figure 6:
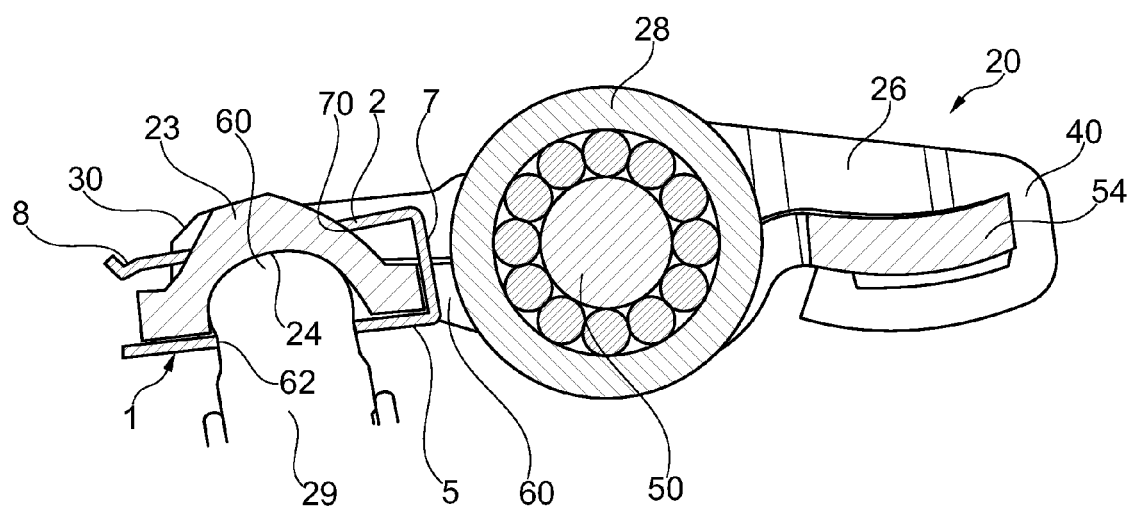
FIG. 6 is a side cross sectional view of the assembly of FIG. 1, including the prior art pivot element of FIG. 3, taken along line A-A.

FIG. 1 is a perspective view of actuating lever 20, with securing device 1 assembled in position thereon. FIG. 2 is a perspective view of securing device 1 of FIG. 1. FIG. 3 is a perspective view of actuating lever 20 of FIG. 1 with roller 28 removed. FIG. 4 is a bottom perspective view of actuating lever 20 and securing device 1 of FIG. 1. FIG. 5 is a front view of prior art pivot element 29. FIG. 6 is a side cross sectional view of FIG. 1, including prior art pivot element 29 of FIG. 5, taken along line A-A of FIG. 1. The following description should be viewed with regard to FIGS. 1 through 6. Actuating lever 20 comprises a support member end 30 and an actuating end 40, with side walls 26 connecting the two ends, each side wall adapted to receive roller 28 and roller axle 50 through axle support recesses 52, approximately centrally located between the two ends, 30 and 40. Support member end 30 comprises side walls 26 horizontally separated by convex pivot element socket dome 23 in top surface 32, formed by concave recess 24 in bottom surface 31 (see FIG. 4) for receiving socket end 66 of support member or pivot element 29 (see FIG. 5). Actuating end 40 comprises side walls 26, horizontally separated by valve actuating land area 54. Roller pocket 60 is the space, formed to accommodate roller 28, between socket dome 23, valve actuating land 54, and side walls 26.

Securing device 1 includes top planar portion 2, having a central perforated section 70 to accommodate convex socket dome 23 of actuating lever 20, bottom bifurcated portion 5, having arms 3 and 4 formed to seat on opposite sides of circumferential groove 62 of pivot element 29, and connecting portion 7 connecting top portion 2 with bottom portion 5, formed or stamped of a single piece of material, such as steel. In order to accommodate other features assembled onto actuating lever 20, such as anti-pop-off features, device 1 is assembled onto actuating lever 20 from roller pocket 60, so that arms 3 and 4 of bifurcated bottom portion 5, can extend into and around opposite ends of circumferential groove 62 of pivot element 29, and leave gap X, to accommodate for said features. In assembled position, perforation 70 of top portion 2 seats on convex dome 23, planar portion 2 then extending to connect to connecting portion 7, which, in turn extends through roller pocket 60, and connects to bifurcated bottom portion 5, having arms 3 and 4, extending on opposite sides of groove 62 of pivot element 29.

Diameter d of groove 62 of pivot element 29 is smaller than diameter D of socket head 66. Therefore, securing device 1 also at least partially retains pivot element 29 within concave recess 24 of actuating lever 20, by arms 3 and 4 at least partially seating within groove 62, preventing complete separation of socket head 66 from recess 24, by socket head 66 contacting an upper surface of arms 3 and 4.

According to one embodiment, each of arms 3 and 4 have inwardly extending tabs 11 and 12, that extend into groove 62 on opposite ends, also including stress relief features 13 and 14, at an end of the arms towards connecting portion 7. It is also contemplated that arms 3 and 4 are uniformly rectangular shaped extending from connecting portion 7 to an opposite end, leaving gap X.

According to one embodiment top portion 2 includes a plastically deformed v- or u-shaped groove 8 at an opposite end from connecting portion 7. Groove 8 provides retention for securing device 1, preventing axial disassembly of securing device 1 from actuating lever 20, by contacting a surface of socket dome 23 if movement occurs.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

What we claim is:

1. A actuating lever assembly for a valvetrain of an internal combustion engine comprising;
   a support element comprising;
      a socket end;
      a circumferential groove below the socket end;
   an actuating lever comprising;
      two side walls connecting an actuating end and a support end;
      the side walls separated by a convex socket dome at the support end and a valve land at the actuating end;
      at least one anti-pop-off tab extending from the support end;
      a concave recess in a bottom surface of the socket dome arranged to receive the socket end of the support element;
      a roller pocket formed by the side walls, socket dome and valve land;
   a securing device comprising;
      a top planar portion;
      a bifurcated bottom portion;
      a connecting portion connecting the top and bottom portions;
      the top planar portion having a circular perforation arranged to seat on the socket dome;
      the bottom portion having two arms extending perpendicularly from the connecting portion and the arms separated by a gap at an opposite axial end;
      at least one of the arms securedly assembled to the at least one anti-pop off tab at an end opposite the connecting portion;
      the securing device assembled from the roller pocket, the connecting portion extending through the roller pocket;
      the securing device secured to the actuating lever, with the perforation seated on an upper portion of the socket dome, the arms extending on opposite sides and at least partially seated in the circumferential groove.

2. The assembly of claim 1, wherein, the top portion includes an axial retention groove located on an end opposite from the connecting portion.

3. The assembly of claim 1, wherein, the securing device is formed from sheet metal.

4. The assembly of claim 1, wherein, the securing device is formed from a plastic material.

5. The assembly of claim 1, wherein, the securing device is made from wire.

6. The assembly of claim 1, wherein the arms have radially inwardly extending tabs, seating into the circumferential groove.

7. A securing device for securing a support element to an actuating lever of a valvetrain of an internal combustion engine comprising;
   a top planar portion;
   a bottom bifurcated portion;
   a connecting portion joining the top and bottom portions;
   the top planar portion having a circular perforation arranged to seat on a socket dome of an actuating lever; and
   the bottom portion having two arms extending perpendicularly from the connecting portion and the arms separated by a gap at an opposite axial end;
   wherein at least one of the arms is arranged to securedly assemble to an anti-pop off tab extending from the socket dome of the actuating lever.

8. The securing device of claim 7, wherein, the device is formed of at least one of sheet metal, wire, or plastic.

9. The securing device of claim 7, wherein, the arms have tabs extending radially inwardly.

* * * * *